United States Patent
Roth

(10) Patent No.: US 10,331,923 B2
(45) Date of Patent: Jun. 25, 2019

(54) RFID ISOLATION TUNNEL WITH DYNAMIC POWER INDEXING

(71) Applicant: AVERY DENNISON RETAIL INFORMATION SERVICES, LLC, Mentor, OH (US)

(72) Inventor: Mark W. Roth, North Miami, FL (US)

(73) Assignee: AVERY DENNISON RETAIL INFORMATION SERVICES LLC, Mentor, OH (US)

( * ) Notice: Subject to any disclaimer, the term of this patent is extended or adjusted under 35 U.S.C. 154(b) by 0 days.

(21) Appl. No.: 15/892,025

(22) Filed: Feb. 8, 2018

(65) Prior Publication Data

US 2018/0165488 A1    Jun. 14, 2018

Related U.S. Application Data

(62) Division of application No. 14/735,736, filed on Jun. 10, 2015, now Pat. No. 9,922,218.

(51) Int. Cl.
*G06K 7/10* (2006.01)

(52) U.S. Cl.
CPC ..... *G06K 7/10435* (2013.01); *G06K 7/10158* (2013.01); *G06K 7/10198* (2013.01); *G06K 7/10316* (2013.01)

(58) Field of Classification Search
CPC .......... G06K 7/0008; G06K 19/0723; G06K 7/10009; G06K 7/10366; G06K 7/10316;
(Continued)

(56) References Cited

U.S. PATENT DOCUMENTS

| 3,693,079 | A | 9/1972 | Walker |
| 3,849,633 | A | 11/1974 | Reitboeck et al. |

(Continued)

FOREIGN PATENT DOCUMENTS

| CN | 100573545 | 12/2009 |
| CN | 102424228 | 4/2012 |

(Continued)

OTHER PUBLICATIONS

Fraunhofer IFF: "RFID Tunnel Gates for Reliable Bulk Reading", Retrieved from the internet: http://www.iff.fraunhofer.de/content/dam/iff/en/documents/publications/rfid-tunnel-gates-for-reliable-bulk-reading-fraunhofer-iff.pdf [retrieved on Mar. 5, 2014].

*Primary Examiner* — Mark S Blouin
(74) *Attorney, Agent, or Firm* — Avery Dennison Retail Information Services LLC

(57) ABSTRACT

A read chamber device is disclosed for use within a radio frequency identification (RFID) scanning enclosure which provides a means of reading a plurality of cartons moving through the enclosure via a conveyor belt. The enclosure is positioned over a section of the conveyor belt, such that the plurality of cartons on the conveyor belt pass directly through the enclosure. The read chamber device is positioned centrally to the enclosure and projects a read zone via an antenna positioned in-line with the flow of the conveyor which allows the read chamber to read a large variety of inlays without changing the configuration settings of the device. The RFID scanning enclosure also utilizes dynamic power indexing (DPI) to combine parameter inputs to create a smarter reader that can anticipate changes. The reader is then manipulated in real-time to adapt to the needs of each carton and the tunnel scanning environment.

15 Claims, 1 Drawing Sheet

(58) Field of Classification Search
CPC ......... G06K 19/07749; G06K 19/0717; G06K 7/10356
USPC ...................................................... 340/10.1
See application file for complete search history.

(56) References Cited

U.S. PATENT DOCUMENTS

| | | | |
|---|---|---|---|
| 3,994,505 A | 11/1976 | Balha | |
| 4,350,883 A | 9/1982 | Lagarde | |
| 5,041,826 A | 8/1991 | Milheiser | |
| 5,196,682 A | 3/1993 | Englehardt | |
| 5,310,784 A | 5/1994 | Ide et al. | |
| 5,689,239 A | 11/1997 | Turner | |
| 5,729,697 A | 3/1998 | Schkolnick et al. | |
| 5,815,252 A | 9/1998 | Price-Francis | |
| 6,107,921 A | 8/2000 | Eberhardt et al. | |
| 6,145,742 A | 11/2000 | Drexler | |
| 6,218,942 B1 | 4/2001 | Vega et al. | |
| 6,371,375 B1 | 4/2002 | Ackley et al. | |
| 6,435,407 B1 | 8/2002 | Fiordelisi | |
| 6,946,951 B2 | 9/2005 | Cole et al. | |
| 6,949,951 B1 | 9/2005 | Young et al. | |
| 6,967,579 B1 | 11/2005 | Elizondo | |
| 7,323,996 B2 * | 1/2008 | Mullins ................... | G01S 13/58 340/572.1 |
| 7,345,635 B2 | 3/2008 | Hohler | |
| 7,425,896 B2 | 9/2008 | Kawamata | |
| 7,468,670 B2 | 12/2008 | Liu et al. | |
| 7,696,882 B1 | 4/2010 | Rahimi et al. | |
| 7,942,323 B2 | 5/2011 | Brod et al. | |
| 7,997,486 B2 * | 8/2011 | Ulrich ................ | G06K 7/10346 235/383 |
| 8,093,989 B2 * | 1/2012 | Deolaliker ........... | G06K 7/0008 340/10.2 |
| 8,149,094 B2 * | 4/2012 | Deoalikar ............ | G06K 7/0008 340/10.2 |
| 8,274,390 B2 * | 9/2012 | Blake ................. | G06K 7/10356 340/539.12 |
| 8,384,521 B2 | 2/2013 | Matsen et al. | |
| 8,496,166 B2 | 7/2013 | Burns et al. | |
| 8,576,051 B2 | 11/2013 | Hansen | |
| 8,604,981 B2 | 12/2013 | Ehlen | |
| 8,901,205 B2 | 12/2014 | Yang et al. | |
| 9,208,362 B1 * | 12/2015 | Fink .................. | G06K 19/07749 |
| 9,830,486 B2 * | 11/2017 | Roth .................. | G06K 7/10435 |
| 10,094,855 B1 | 10/2018 | Fuhr et al. | |
| 2001/0015380 A1 | 8/2001 | Good et al. | |
| 2001/0022559 A1 | 9/2001 | Takahashi et al. | |
| 2001/0050654 A1 | 12/2001 | Killen et al. | |
| 2002/0070862 A1 | 6/2002 | Francis et al. | |
| 2002/0180588 A1 | 12/2002 | Erickson et al. | |
| 2002/0183882 A1 | 12/2002 | Dearing et al. | |
| 2003/0085267 A1 | 5/2003 | Piotrowski et al. | |
| 2003/0189490 A1 | 10/2003 | Hogerton et al. | |
| 2004/0032443 A1 | 2/2004 | Moylan et al. | |
| 2004/0084526 A1 | 5/2004 | Knowles et al. | |
| 2004/0113850 A1 | 6/2004 | Olsen | |
| 2004/0153379 A1 | 8/2004 | Joyce et al. | |
| 2004/0172160 A1 | 9/2004 | O'Dougherty et al. | |
| 2004/0196143 A1 | 10/2004 | Crump et al. | |
| 2005/0012613 A1 | 1/2005 | Eckstein et al. | |
| 2005/0068161 A1 | 3/2005 | Ichinose et al. | |
| 2005/0110641 A1 | 5/2005 | Mendolia et al. | |
| 2005/0218219 A1 | 10/2005 | Sano et al. | |
| 2005/0253687 A1 | 11/2005 | Martinez et al. | |
| 2006/0004484 A1 | 1/2006 | Hornbaker et al. | |
| 2006/0043177 A1 | 3/2006 | Nycz et al. | |
| 2006/0043179 A1 | 3/2006 | Nycz et al. | |
| 2006/0071070 A1 | 4/2006 | Maier | |
| 2006/0080819 A1 | 4/2006 | McAllister | |
| 2006/0170556 A1 | 8/2006 | Fang | |
| 2006/0187041 A1 | 8/2006 | Olsen et al. | |
| 2006/0208072 A1 | 9/2006 | Ku et al. | |
| 2006/0287759 A1 | 12/2006 | Charych | |
| 2007/0013485 A1 | 1/2007 | Edwards et al. | |
| 2007/0030150 A1 | 2/2007 | Mullins | |
| 2007/0080804 A1 | 4/2007 | Hirahara et al. | |
| 2007/0126578 A1 | 6/2007 | Broussard | |
| 2007/0135961 A1 | 6/2007 | Ishida et al. | |
| 2007/0185613 A1 | 8/2007 | Feldenzer | |
| 2007/0254587 A1 | 11/2007 | Schadler et al. | |
| 2007/0279311 A1 | 12/2007 | Kai et al. | |
| 2008/0011836 A1 | 1/2008 | Adema et al. | |
| 2008/0018475 A1 | 1/2008 | Breed et al. | |
| 2008/0061984 A1 | 3/2008 | Breed et al. | |
| 2008/0094179 A1 | 4/2008 | Domenico et al. | |
| 2008/0122623 A1 | 5/2008 | Hause et al. | |
| 2008/0185540 A1 | 8/2008 | Turner et al. | |
| 2008/0213498 A1 | 9/2008 | Drzal et al. | |
| 2008/0231431 A1 | 9/2008 | Stawar et al. | |
| 2008/0237339 A1 | 10/2008 | Stawar et al. | |
| 2009/0033493 A1 | 2/2009 | Lin et al. | |
| 2009/0039147 A1 | 2/2009 | Yamamoto et al. | |
| 2009/0079565 A1 | 3/2009 | Mackenzie et al. | |
| 2009/0160646 A1 | 6/2009 | Mackenzie et al. | |
| 2009/0237217 A1 | 9/2009 | Ohkubo et al. | |
| 2010/0217678 A1 | 8/2010 | Goncalves | |
| 2010/0237999 A1 | 9/2010 | Hilgers | |
| 2011/0025569 A1 | 2/2011 | Payne | |
| 2011/0068992 A1 | 3/2011 | Payne | |
| 2011/0095866 A1 | 4/2011 | Karr | |
| 2011/0106681 A1 | 5/2011 | Cockerell | |
| 2012/0019364 A1 | 1/2012 | Reichenbach et al. | |
| 2012/0075073 A1 | 3/2012 | Fislage | |
| 2012/0075074 A1 | 3/2012 | Frosch et al. | |
| 2012/0149300 A1 | 6/2012 | Forster | |
| 2012/0161937 A1 | 6/2012 | Chen | |
| 2012/0256732 A1 | 10/2012 | McAllister | |
| 2013/0141222 A1 | 6/2013 | Garcia | |
| 2013/0342322 A1 | 12/2013 | Hinman et al. | |
| 2014/0158766 A1 | 6/2014 | Paske et al. | |
| 2014/0184391 A1 | 7/2014 | Elizondo, II | |
| 2014/0292499 A1 | 10/2014 | Zhang et al. | |
| 2015/0029001 A1 | 1/2015 | Pleshek et al. | |
| 2015/0127362 A1 | 5/2015 | DeBusk et al. | |
| 2015/0136849 A1 | 5/2015 | Bremer et al. | |
| 2016/0117530 A1 | 4/2016 | Roth | |
| 2016/0117534 A1 | 4/2016 | Roth | |

FOREIGN PATENT DOCUMENTS

| | | |
|---|---|---|
| CN | 202193383 | 4/2012 |
| WO | 2000005674 | 2/2000 |
| WO | 2007104339 | 9/2007 |
| WO | 2009002156 | 12/2008 |

* cited by examiner

RFID ISOLATION TUNNEL WITH DYNAMIC POWER INDEXING

CROSS-REFERENCE TO RELATED APPLICATION(S)

The present application is a divisional application of and claims priority to and the benefit of U.S. Utility patent application Ser. No. 14/735,736 filed Jun. 10, 2015, which is incorporated herein by reference in its entirety.

BACKGROUND

The present invention relates generally to radio frequency identification (RFID) systems and devices. More particularly, the present disclosure relates to systems and devices for further confining and focusing radio frequency energy when applied with the use of RFID transponders that are moving in high speed linear motion through use of a conveyance to allow for the singulation of carton contents.

Radio frequency identification (RFID) tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine identification and characteristics of an item.

Currently, the need for the ability to scan RFID transponders in automated environments has caused the creation of a scanning tunnel or enclosure (i.e., a RFID dynamic tunnel scanner). Different manufacturers may take different approaches to scanning these transponders. Typically, an enclosure uses a combination of absorber material to attenuate radio frequency energy and a read chamber central to the enclosure that projects a read zone. Thus, the read chamber uses an absorber method that directs the main flow of energy normal to the antenna plain, creating the read zone. However, although this does create a field or read zone, it does not allow for tuning of the read zone. Refinement (or tuning) of the leading edge signal of the read zone is critical to the success of reducing the overall gap or spacing required between cartons. Further, some degree of tuning can be done by means of power modulation to the antenna contained within the read chamber. However, this is only marginally effective as a function of the power decreases so does the effectiveness of the reader to energize the transponders.

Furthermore, the main challenge in utilizing a RFID dynamic tunnel scanner is the inability to capture all of the inlay/transponders applied to each individual item within a given carton. Specifically, spacing between cartons, speed of the conveyor equipment, power supplied by the RFID reader, among other parameters are all very difficult to manage to achieve a 100% read rate without creating over-read conditions whereby inlays from adjacent cartons upstream or downstream of the intended carton are read as well. The other end of the spectrum of course is not reading all of the tags properly. Typically, this is overcome by lowering power or tuning the solution to a specific inlay type. This can be done by filtering software data and using a probability model to take a "best guess" as to the completeness of a particular carton. This method may be acceptable to some end users but is limited as it assumes a level of inaccuracy, as it is based on a best guess of the volume of information fed to the model.

Another way to overcome this problem is tuning to a specific power setting for a particular inlay. However, this method may not work if the user utilizes multiple inlay types across their product portfolio. This use of multiple inlay types sets up a scanning requirement where potentially both high and low sensitivity tags are in use. In a manufacturing environment, it is common to use a single inlay as there is consistent product. However, in a distribution environment any number of carton sizes and item types can be moved through the system. This larger variety of product will most likely have a variety of two or more different inlay types. Thus, RFID dynamic scanning requires adaptability.

Another method is software filtering. This method of filtering may not work, because it does not preclude the reading of extraneous inlays that happen to be nearby. Thus, the system is forced to make a judgment whether or not to include the inlay or inlays that happen to be seen in the field as part of a carton count. As a result, intended inlays may not be included. Accordingly, this method depends exclusively on the software for "accuracy" verses a well-designed tunnel that provides superior isolation.

The present invention discloses a RFID dynamic tunnel scanner, which doesn't depend on software for accurate reads. Instead, the RFID dynamic tunnel scanner relies on the physics of carefully manipulated radio frequency energy. Further, the proposed RFID dynamic tunnel scanner provides adaptability to changing conditions in real-time, thus providing a greater ability of handling a large variety of inlay challenges now, as well as in the future.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a read chamber device for use within a radio frequency identification (RFID) scanning enclosure (or tunnel) which provides a means of reading a plurality of cartons moving through the enclosure via a conveyor belt. The RFID scanning enclosure is positioned over a section of the conveyor belt, such that the plurality of cartons on the conveyor belt pass directly through the RFID scanning enclosure. The read chamber device is positioned centrally to the enclosure and projects a read zone via an antenna positioned in-line with the flow of the conveyor which allows the read chamber to read a large variety of inlays without changing the configuration settings of the device.

In a preferred embodiment, the RFID scanning enclosure utilizes dynamic power indexing (DPI) to combine parameter inputs to create a smarter reader that can anticipate changes. Dynamic power indexing also provides a means to vary the parameters of the reader on the fly to handle a variety of carton sizes. Specifically, the method of dynamic power indexing can combine any number of inputs prior to the intended carton to be scanned. The reader is then manipulated in real-time to adapt to the needs of each carton and the tunnel scanning environment. The input parameters could be any combination of the following: Carton ID, TID, RSSI, Read Count, Inlay type, Power Level, Reader On Time, Delay, and conveyor speed. All of which are preprocessing steps that would be incorporated into setting the correct configuration pertaining to each target carton. The use of DPI augments the design of the RFID scanning enclosure which provides isolation and enhances intelligent decision making and adaptability.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
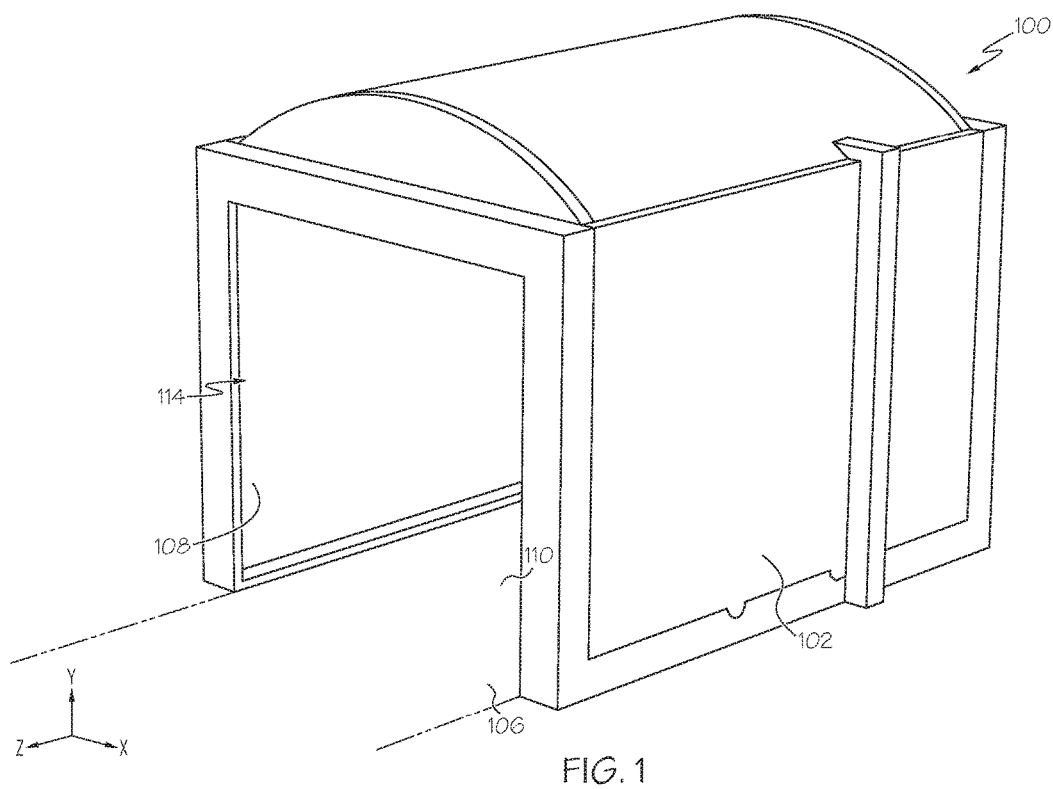
FIG. 1 illustrates a perspective view of the read chamber device and RFID scanning enclosure in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a read chamber device for use within a radio frequency identification (RFID) scanning enclosure which provides a means of reading a plurality of cartons moving through the enclosure via a conveyor belt. The enclosure is positioned over a section of the conveyor belt, such that the plurality of cartons on the conveyor belt pass directly through the enclosure. The read chamber device is positioned centrally to the enclosure and projects a read zone via an antenna positioned in-line with the flow of the conveyor which allows the read chamber to read a large variety of inlays without changing the configuration settings of the device. The RFID scanning enclosure also utilizes dynamic power indexing (DPI) to combine parameter inputs to create a smarter reader that can anticipate changes. The reader is then manipulated in real-time to adapt to the needs of each carton and the tunnel scanning environment. The use of DPI augments the design of the RFID scanning enclosure which provides isolation and enhances intelligent decision making and adaptability.

Referring initially to the drawings, FIG. 1 illustrates a read chamber device 100 for use within a radio frequency identification (RFID) scanning enclosure (or tunnel) 102 which provides a means of reading a plurality of cartons (not shown) moving through the enclosure 102. Typically the plurality of cartons move through the enclosure 102 via a conveyor belt 106 or other transport mechanism as is known in the art. The RFID scanning enclosure 102 is positioned over a section of the conveyor belt 106, such that the plurality of cartons on the conveyor belt 106 pass directly through the RFID scanning enclosure 102.

Once the plurality of cartons enters the enclosure 102 via conveyor belt 106, an antenna 108 projects radio frequency energy to create a read zone 110 for the reader. RFID tags (or transponders) on the cartons are energized and read in the read zone 110 by the reader and signals are transmitted back to the reader, identifying the carton and transmitting any other information the tags 112 might contain. One of ordinary skill in the art will appreciate that using the enclosure 102 to read RFID tags on cartons is merely one possible example and the same system may be used for any application that involves a reading of any group of items that are streaming through a particular location. Thus, although the term "carton" is used throughout the present disclosure for exemplary purposes, the term "carton" may be any single item or a group of items.

The RFID scanning enclosure 102 can be any suitable size, shape, and configuration as is known in the art without affecting the overall concept of the invention. One of ordinary skill in the art will appreciate that the interior and/or exterior shape of the enclosure 102 as shown in FIG. 1 is for illustrative purposes only and many other shapes of the enclosure 102, such as a cylinder or a rectangle, are well within the, scope of the present disclosure. Although dimensions of the enclosure 102 (i.e., length, width, and height) are important design parameters for good performance, the enclosure 102 may be any shape that ensures an optimal read zone 110 toward a carton within the enclosure 102.

Further, the RFID scanning enclosure 102 comprises a tunnel throat (or opening) 114 wherein cartons 104 enter the enclosure 102 via the conveyor belt 106. The tunnel opening 114 is designed to deal with motility and movement of the conveyor belt 106 the products or cartons 104 are traveling on. For example, the tunnel opening can have a throat capacity of approximately 30".

Furthermore, the scanning enclosure 102 projects a read zone 110 via at least one antenna 108. Specifically, a combination of different antenna sets are used which reduces the need for a bulky read chamber. Further, the antennas 108 are in-line with the flow of the conveyor, which allows the read chamber to read a large variety of inlays, and at the same configuration settings. The at least one antenna 108 of the present invention, in one embodiment, may be very thin profile antenna allowing integration into at least one wall of the enclosure. The at least one antenna may have a narrow beam width. Any suitable number of antennas 108 and/or combination of different antenna sets can be used as is known in the art, depending on the wants and needs of a user and the configuration of the enclosure 102. Further, any suitable type of antenna can be used as is known in the art, such as a wide angle antenna, linear, circular, air gap, narrow beam, and/or omni-directional antenna etc., depending on the wants and needs of a user and the configuration of the enclosure 102.

Additionally, a resistive sheet absorber technique which uses strategic placement internal to the structure is secured within the enclosure. The resistive sheet absorber material typically comprises a thin film material combined with a defined air gap, though any other suitable material can be used as is known in the art. Thus, energy projected (or leaked) to the sides of the antenna 108 is canceled through the use of the resistive sheet absorber material to create a fixed read zone 110. Accordingly, cartons (and their transponders or tags) entering the fixed read zone 110 are detected and read by the reader and information contained within the tags is transmitted to the reader.

Overall, the RFID scanning enclosure 102 comprises a smaller size form factor than the prior art scanning enclosures, and does not have a bulky read chamber. The RFID scanning enclosure 102 relies 100% on the physics of the RF field (or zone), not software filtering, and utilizes isolation to prevent both over-reads and stray reads outside the tunnel. The RF scanning enclosure 102 also comprises a multi-inlay read capability and higher read density. The RF scanning enclosure 102 utilizes a lamination bonding technique to eliminate the need for an internal or external frame or exoskeleton. The RF scanning enclosure 102 integrates a unique antenna design with a superior axial ratio. Further, the RF scanning enclosure 102 utilizes a resistive sheet absorber technique which uses strategic placement internal to the structure. An interior liner provides a contiguous clean smooth surface for both protection of components as well as avoids any potential catch points. The RF scanning enclosure 102 comprises an upper housing to house all electronic and micro control required hardware, and shielded cable routing to negate energy slipping through the interior pass-through. In one embodiment, antennas are mounted in strategic locations on at least one wall of the enclosure of the present invention. The absorber may reside on the outboard surfaces to attenuate stray signal from projecting outside enclosure.

Furthermore, the RFID scanning enclosure 102 utilizes dynamic power indexing (DPI) to combine very desperate inputs to create a smarter reader that can anticipate changes. Dynamic power indexing also provides a means to vary the parameters of the reader on the fly to handle extremes of packaging from high density item packs to small light weight items as well as the variety of carton sizes. Thus, DPI takes a more proactive approach to understanding what is about to be scanned and adjusting the system for each cartons needs. Specifically, the method of dynamic power indexing can combine any number of inputs prior to the intended carton to be scanned. The reader is then manipulated in real-time to adapt to the needs of each carton and the tunnel scanning environment.

Typically, a reader is set to one power setting, and in many cases end users choose to operate at full allowable RF power and are then forced to increase the gaps between cartons. This also requires a user to physically isolate surrounding inventory, and to use software models in the background to attempt to achieve accurate counts. However, even with the use of software models, stray reads are still inevitable, and productivity throughput is typically very slow as larger gaps require more time to process goods.

The use of DPI augments the design of the RFID scanning enclosure 102 which provides isolation and enhances intelligent decision making and adaptability. DPI combines any number of inputs to change the reader settings in real-time to provide optimum read conditions for each specific carton. The reader is then tuned to the needs and characteristics of each individual carton. The input parameters could be any combination of the following: Carton ID, TID, RSSI, Read Count, Inlay type, Power Level, Reader On Time, Delay, and conveyor speed. All of which are pre-processing steps that would be incorporated to setting the correct configuration pertaining to each target carton. Some of these tasks can be done with a micro controller feeding an RFID reader. Another method is to use the GPIO functionality of the reader itself to take in inputs. Another alternative is to incorporate an upstream antenna/reader dedicated to this preprocessor task.

The following is a description of the parameters and their uses in the process. For example, TID, which represents the chip manufacturer's unique serial number can be used as a parameter. Although it is possible the same chip manufacturer type could be used in multiple inlays, it is unlikely if differing size labels are used, so this parameter could be used as a supplemental feed verses a primary determiner of settings. Further, knowing the TID does provide insight as to the read sensitivity of the chip no matter what the inlay type may be, allowing for adjustments in power level up or down as needed by that chip's characteristics. For example, slower responding chips may need more time or more energy saturation to achieve complete reads.

Another parameter is carton size. This parameter is not the actual carton size but the virtual carton size as represented by the movement of a carton on a conveyor, which are two very different things to consider. Actual carton size represents the measured values of the corrugate as measured by a tape measure. Virtual carton size is measured by edge trigger sensing and combined with the actual speed of the conveyor to determine the real size of the box as would be seen by the tunnel system. Virtual carton size helps take into account the inherent slippage that occurs when cartons are moving on a conveyor. It also helps factor for the variance in actual speed as a result of varying carton weights thus possibly making the carton appear longer or shorter than it really is.

Another parameter is (RSSI) Receive Signal Sensitivity Indicator, which is a rough gauge of how the reader perceives the inlays that are within its field of influence. This has proven to be a parameter that cannot be relied on exclusively for tuning a dynamic system but is a great asset to act as a supplemental feed for building a configuration. RSSI could be used to set base line thresholds to weed out questionable inlays or carton packing inaccuracies.

Another parameter is read count, which is the number of times each individual inlay is seen by the reader while in the RF field. Again this would be a strong parameter in combination with other parameters such as RSSI to determine speed or power level settings.

The parameter of Carton ID has multiple roles. It can be the most powerful parameter but most data records in customer databases do not currently contain fields that include the other parameters in the listing. Using the Carton ID will allow a predetermination of what should be in the box and how many (i.e., the quantity). Additionally, the Carton ID could provide information on what type of label/tag/inlay should be attached to those items. It could also inform the Dynamic Power Indexing software what types of items in relation to composition and density that should be expected. Further, it may also provide critical information as to anticipate pack density such as loose fill or densely packed denim for example.

Another supplemental parameter that goes one step above the TID is inlay type. Inlay type helps to provide feedback on whether the tag being used is very robust with good omni-directional capability or is a very orientation sensitive tag. Further, this parameter can have a big impact on how the reader is configured to deal with easily read inlays verses inlays requiring a properly polarized field.

Further, power or power level is a primary parameter fed to the reader in real-time based on the other parameters that have been feed into a calculation. Typically, power needs can vary greatly per carton. The Reader On Time parameter is essentially the burst duration when the read cycle is turned on. This can vary greatly based on all the parameters fed to the system to determine best setting. For example, small measured boxes may only require a very short burst of energy while in the field, whereas longer boxes need a longer duration. Reader On Time can also be a function of what is inside the carton. Higher density contents may require longer Reader On Time to energize and capture all the tags.

The Timing parameter is a calculation based on the total pre-read read cycle. Time is a function of the distance of where the pre-read analysis takes place before entering the tunnel. Specifically, how far upstream and how much time does it take before the carton is delivered? The Delay parameter is the amount of delay needed from the time the edge of the carton is seen to the time the reader is activated to read tags in a carton. Delay may be a function of what the dynamic algorithm indicates or a fixed value. Further, Delay determines the distance the carton has moved into the field (read zone) before the read session is turned on.

Conveyor control is another parameter that can be advantageous. If gap sequencing is used, this parameter can assist with the metering aspect. The value that is used can then be fed into the overall algorithm determining reader configuration settings. The Conveyor speed parameter, which is the value of obtaining and knowing the accurate speed measurement of the conveyor speed should not be discounted. A wide variety of situations can influence the real speed of the conveyor. For example, true slew rate, load bearing, inherent slippage, power (brown out), and variable speed adjustment are but some of the factors changing the perceived size of any given carton.

With edge sensing upstream of the actual tunnel, the Carton Gap parameter can be added to make adjustments to the system where typically a minimum gap standard has to be set as carton spacing is unknown. Typically, systems are designed with leading edge to leading edge physical measurements wherein minimum gaps are determined by the largest carton size. However, this does not account for smaller carton sizes that increase gaps where higher power settings could be used for the RFID scanning solutions advantage.

The use of DPI does not imply that all of the parameters listed above are all inclusive. Other parameters not listed may be employed with DPI as they come available with ever evolving technology refreshes. However, DPI does imply that through the use of the Dynamic Power Indexing technique a superior dynamic RFID scanning environment can be created and configured in real-time to meet the specific criteria required to match the specific needs of each carton and their respective items tagged with inlays contained within.

Specifically, software would be developed to encompass all listed parameters and a user would choose what combination of parameters to use to achieve the highest performance for the given infrastructure conditions. The DPI method also allows the possibility of narrower gaps or even the ability to deal with varying gaps between cartons verses a minimum fixed index value.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of utilizing an RFID scanning enclosure with dynamic power indexing, comprising:
    varying parameters of the enclosure in real-time to handle a variety of carton sizes;
    configuring a target carton which is about to be scanned;
    adjusting the enclosure for each carton's needs;
    combining any number of input parameters prior to scanning the target carton; and
    tuning the enclosure to needs and characteristics of each individual carton; and
    wherein the input parameters can be any combination of following: Carton ID, TID, RSSI, Read Count, Inlay type, Power Level, Reader On Time, Delay, and conveyor speed.

2. The method of claim 1, further comprising incorporating a predetermined set of input parameters into pre-processing steps for the enclosure to set a specific configuration for each target carton.

3. The method of claim 2, wherein the input parameters are incorporated via a micro controller which feeds an RFID reader.

4. The method of claim 2, wherein the input parameters are incorporated via GPIO functionality of the reader.

5. The method of claim 2, wherein the input parameters are incorporated via incorporating an upstream antenna/reader dedicated to this preprocessor task.

6. The method of claim 1, wherein software is developed to encompass the parameters.

7. The method of claim 1, wherein the method allows for a possibility of varying gaps between cartons.

8. The method of claim 1, wherein the enclosure is a cylinder.

9. The method of claim 1, wherein the enclosure has a tunnel with an opening.

10. The method of claim 9, wherein the opening has a capacity of 30".

11. The method of claim 1, wherein the enclosure has a read zone via at least one antenna.

12. The method of claim 11, wherein the at least one antenna has an axial ratio.

13. The method of claim 1, wherein the enclosure includes a resistive sheet absorber material.

14. The method of claim 13 wherein the material is mounded on an outboard surface of the enclosure.

15. The method of claim 1, wherein the enclosure relies on physics of an RF field and utilized isolation to prevent over-reads and stray-reads.

* * * * *